(12) United States Patent
Christensen

(10) Patent No.: US 8,100,624 B2
(45) Date of Patent: Jan. 24, 2012

(54) SACK TRUCK

(75) Inventor: Svend Rahbek Christensen, Lemvig (DK)

(73) Assignee: New Invention ApS, Lemvig (DK)

( * ) Notice: Subject to any disclaimer, the term of this patent is extended or adjusted under 35 U.S.C. 154(b) by 494 days.

(21) Appl. No.: 11/922,169

(22) PCT Filed: Jun. 15, 2006

(86) PCT No.: PCT/DK2006/000344
§ 371 (c)(1),
(2), (4) Date: Dec. 26, 2007

(87) PCT Pub. No.: WO2006/133712
PCT Pub. Date: Dec. 21, 2006

(65) Prior Publication Data
US 2009/0290964 A1 Nov. 26, 2009

(30) Foreign Application Priority Data
Jun. 15, 2005 (DK) .................................. 2005 00875

(51) Int. Cl.
*B60P 1/04* (2006.01)

(52) U.S. Cl. ...................... 414/490; 414/446; 280/47.18; 280/47.28; 280/47.29

(58) Field of Classification Search .................. 414/490, 414/446, 608; 280/47.18, 47.28, 47.29
See application file for complete search history.

(56) References Cited

U.S. PATENT DOCUMENTS

| | | | |
|---|---|---|---|
| 2,488,461 A | 11/1949 | Wysocki | |
| 5,584,097 A | 12/1996 | Lu | |
| 5,938,396 A | 8/1999 | Audet et al. | |
| 6,457,727 B1 | 10/2002 | Tolly | |
| 2001/0038786 A1 | 11/2001 | Kim | |
| 2004/0031445 A1* | 2/2004 | Harrison, Jr. | 119/400 |
| 2004/0080128 A1 | 4/2004 | Lindsey et al. | |
| 2004/0256818 A1 | 12/2004 | Amsili | |

FOREIGN PATENT DOCUMENTS

| | | |
|---|---|---|
| DE | 1037964 | 2/1957 |
| GB | 2390575 | 1/2004 |
| WO | WO 03/066408 | 8/2003 |

* cited by examiner

Primary Examiner — Scott Lowe
(74) Attorney, Agent, or Firm — James Creighton Wray

(57) ABSTRACT

The present invention relates to a sack truck (1) comprising a main frame (2), a number of handles (3), a number of wheels (4) and a first foot plate (5), where the handles (3) are connected at an upper end of the main frame (2), and the wheels (4) and the first foot plate (5) are connected at a lower end of the main frame (2), wherein the main frame (2) comprises a first and a second frame part (9, 10), which are arranged to engage at a displacement arrangement allowing a displacement of the first frame part (9) in relation to the second frame part (10).

10 Claims, 7 Drawing Sheets

SACK TRUCK

Figure 1:
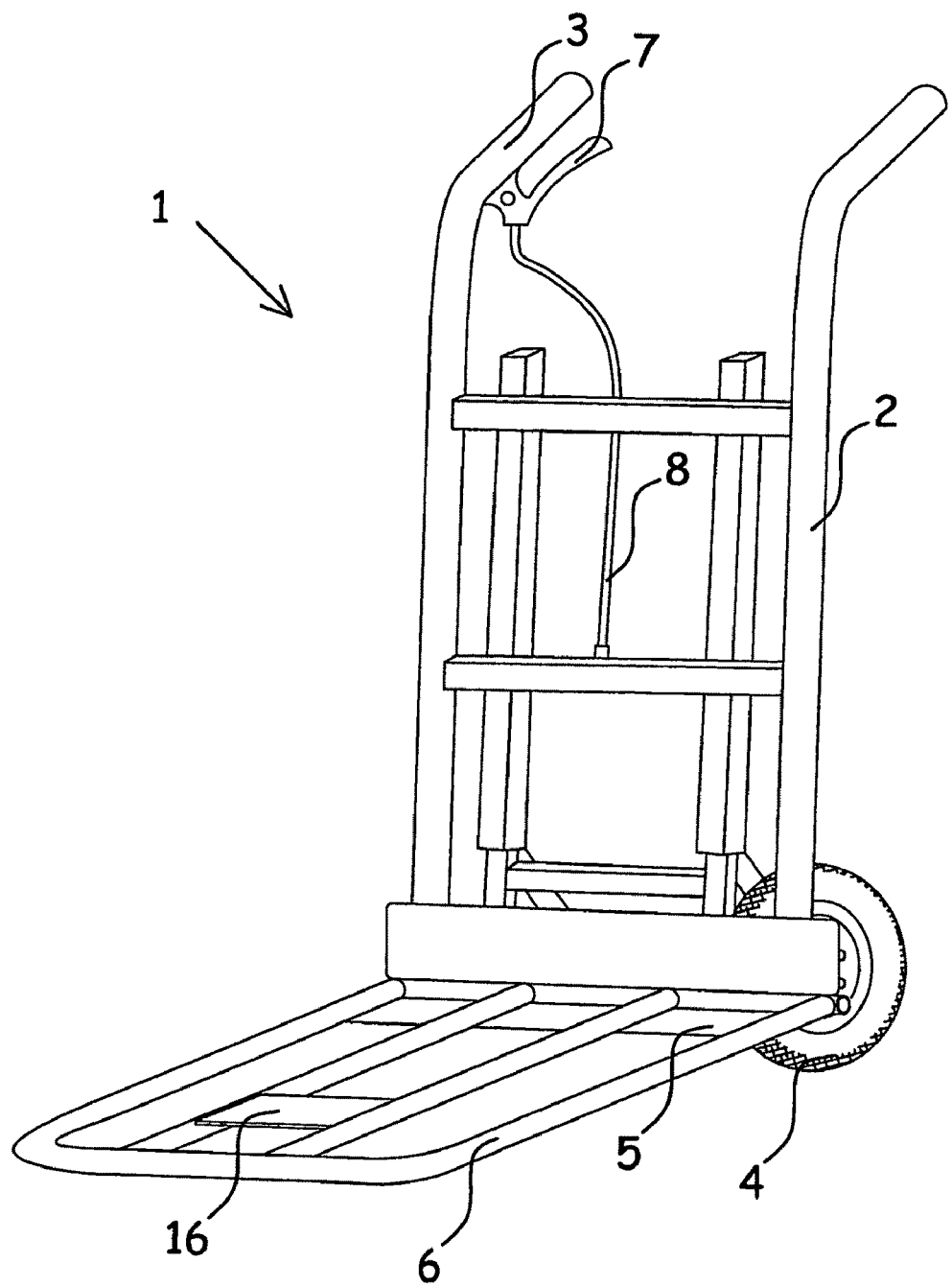

This application claims the benefit of Danish Application No. PA 2005 00875 filed Jun. 15, 2005 and PCT/DK2006/000344 filed Jun. 15, 2006, which are hereby incorporated by reference in their entirety.

FIELD OF THE INVENTION

The present invention relates to a sack truck comprising a main frame, a number of handles, a number of wheels and a first foot plate, where the handles are connected at an upper end of the main frame and the wheels, and the first foot plate is connected at a lower end of the main frame, wherein the main frame comprises a first and a second frame part, which are arranged to engage at a displacement arrangement allowing displacement of the first frame part in relation to the second frame part.

BACKGROUND OF THE INVENTION

It can be very a very strenuous job to load heavy loads in the shape of e.g. boxes, crates or bags onto a vehicle, and at worst the person lifting the heavy load receives a back injury.

To avoid carrying heavy loads over long distances, e.g. from a shop counter to a vehicle, trolleys or sack trucks are used to lighten the transport load.

In connection with the loading of a vehicle there is a problem, as the truck floor or the vehicle luggage compartment typically is situated between 20-100 centimeters from the ground, hence the load must be lifted from the trolleys or sack trucks into the truck or the luggage compartment.

By means of a pallet truck or a lifting table the heavy load is lifted up to the level of the truck floor or the luggage compartment to eliminate the problems connected with manual lifting.

However, there are some major drawbacks connected with using pallet trucks or lifting tables, as pallet trucks and lifting tables are:
  Expensive,
  unhandy,
  provided with small wheels, hence it is difficult to move the devices on uneven surfaces,
  not always available in supermarkets or stores,
  not considered as part of an ordinary household.

Usually a sack truck comprises a main frame consisting of two through-going side profiles, which are separated by a number of stiffener profiles. The upper end of the side profiles are either typically bend for providing the handles or connected to separate handles.

At the lower end of the through-going side profiles a foot plate is connected, which foot plate is arranged in an angle from the side profiles making it possible to place a heavy load on the foot plate, and when the sack truck is tilted backwards the heavy load rests on both the foot plate and the side profiles/stiffener profiles.

The wheels are positioned opposite the foot plate on a shaft, which is connected to the . side profiles, hence it is possible to tilt the sack truck to lift the foot plate from the ground and then move the sack truck.

The wheels can be of different types, e.g.:
  Air inflated rubber tires, which are advantageously used to transport heavy loads or to move the sack truck on uneven surfaces.
  Solid plastic or rubber wheels, which are very cheap.
  Rolls, cylinders or the like made of e.g. plastic, rubber or metal.

A sack truck mentioned by way of introduction is known from WO03/066408. This sack truck has only one foot plate, which has a substantial size in order to support heavy loads, which are positioned on the foot plate. However, this makes the sack truck rather bulky and difficult to transport. Moreover it is not possible to use this sack truck in more than one configuration, namely a configuration typically applied to a heavy or bulky load on the foot plate. It is not possible to establish a less bulky configuration as typically applied to loads of small dimensions.

Furthermore, a sack truck is known from US2004/256818, which comprises only one foot plate and which is connected with the same drawbacks as the drawbacks associated with the above mentioned sack truck disclosed in WO03/066408.

OBJECT OF THE INVENTION

It is the object of the present invention to provide an improved sack truck, by means of which it is possible to transport and lift a heavy load, and where the sack truck is mechanically simple and can be used as a conventional sack truck which is also easy to transport in a condition, where it has a limited size.

This is achieved with a sack truck as described in the introductory paragraph, and wherein a second foot plate is pivotally connected to the first foot plate or the first frame part.

DESCRIPTION OF THE INVENTION

To carry heavy loads of a large dimension and ensure safe support of the heavy loads on the sack truck, the second foot plate is pivotally connected to the first foot plate or the first frame part.

As the second foot plate is pivotally connected to the first foot plate or the first frame part, it is possible to use the sack truck in two configurations:
  A first configuration, where the second foot plate is placed upright against the first frame part and then the heavy loads are positioned on the first foot plate, when it is transported or lifted. This configuration typically applies for heavy loads of small dimensions.
  A second configuration, where the second foot plate is unfolded and thus rests on the first foot plate, and heavy loads are positioned on the second foot plate, when it is transported or lifted. Furthermore, the support from the first foot plate of the second foot plate ensures that the second foot plate is maintained in an angle position from the first frame part, thereby making it possible to securely place a heavy load on the second foot plate, without risking a continuous rotation of the second foot plate.

To prevent the second foot plate from rotating back to upright position against the first frame part, when the vertical displacement of the first frame part in relation to the second frame part occurs, the second foot plate comprises a locking arrangement arranged for pivotal connection to the first foot plate or the first frame part. Moreover the sack truck is easy to transport in said first configuration, where the second foot plate is placed upright against the first frame part seeing that it will be less bulky than if the second foot plate is unfolded and rests on the first foot plate.

The vertical displacement of the first frame part in relation to the second frame part allows a load to be placed on the foot plate and allows the foot plate to be lifted upwards until the load is level with the truck floor or the luggage compartment, which makes it easy to move the load into the truck or the vehicle luggage compartment.

According to a preferred embodiment of the present invention the handles and the first foot plate are connected to the first frame part, and the wheels are arranged in connection with the second frame part. Hence the entire first frame part with handles and foot plate is vertically moved, meanwhile the second frame part with the wheels is stationarily positioned on the underlying surface.

Alternatively, both the first and second frame part can be provided with guide rails or tube which engage and control the vertical displacement.

To maintain the vertically elevated position of the first frame part in relation to the second frame part, the displacement arrangement comprises a toothed rack bar and pawl arrangement. According to one embodiment of the present invention the first frame part is provided with guide tubes, which are arranged to receive the toothed rack bars, which are formed as an upper part of the second frame part.

The pawl arrangement comprises at least one pawl and one spring. The pawl is positioned preferably perpendicular to the toothed rack bar, and the spring ensures that the pawl engages with the teeth of the toothed rack bar.

The part of the pawl, which engages with the teeth of the toothed rack bar is formed with an end part with at least one sloping side, thus allowing the pawl to be moved fairly easily in one direction along the toothed rack bar, hence allowing the first frame part to be vertically upward displaced in relation to the second frame part.

The engaging of the pawl with the teeth of the toothed rack, the spring force and the form of the pawl's end part ensure that any accidental vertical downward displacement of the first frame part in relation to the second frame part is prevented, and the heavy load on the foot plate can be maintained at any wanted level.

To release the engagement of the displacement arrangement, the arrangement, furthermore, comprises a deactivating unit, thus allowing vertical downward displacement of the first frame part in relation to the second frame part meaning that the sack truck is ready to carry another heavy load.

According to a preferred embodiment of the present invention the deactivating unit comprises a spring compression unit, which is connected to the wire of an operating handle and which is activated by means of the operating handle, which is mounted to one of the handles on the first frame part.

The activation of the displacement arrangement operating handle causes the spring compression unit to compress the spring, which previously provided pressure onto the pawl, hence the pressure force on the pawl is significantly reduced or nullified, thus it is possible to cause vertical downward displacement of the first frame part in relation to the second frame part either by means of gravity on the first frame part or by pushing the first frame part downwards.

Alternatively, the displacement arrangement comprise of:
- engaging guide bars arranged on the first and the second frame parts, where the first and the second frame parts are connected with at least one wire, which can be winded up on a ratchet wheel, which is provided with a run-back brake, or
- a gear wheel arrangement where the first and the second frame parts are connected with a number of gear wheels, which e.g. can be deactivated with a revolving handle arranged at one of the gear wheels.
- a pawl and hole arrangement, where either the first or the second frame parts is provided with the pawl and the other part is provided with a row of holes.
- a breaking arrangement, where the guide rails/tubes are provided with a breaking lining.

To avoid damaging the sack truck loads in case the displacement arrangement dysfunction or the sack truck is used for unloading heavy loads, the displacement arrangement, furthermore, comprises shock absorber means, which e.g. can be a cylinder, a one-way compressible material or the like.

According to one embodiment of the present invention the locking arrangement is a shifting arrangement with two settings, where the pivotal movement in one setting allows the pivotal movement of the second foot plate and in the second setting prevents the pivotal movement of the second foot plate. The activation/deactivation of the shifting arrangement occurs by a horizontal movement of the second foot plate along with the shaft connecting it to the first foot plate or the first frame part. Furthermore, the shifting arrangement could comprise a spring, thus ensuring that the second foot plate preferably is positioned in either side of the settings.

Alternatively, the locking arrangements could be a pawl engaging a hole through the shaft where about the pivotal movement occurs.

To safely lift the heavy load and maintain the first foot plate and/or the second foot plate in a secure distance from the back end of the vehicle, the first foot plate and/or the second foot plate comprise a coupling unit, which is formed to enclose the ball of the vehicles towing hook.

Furthermore, the coupling of the coupling unit and the ball of the vehicle towing hook ensure that the first foot plate and/or the second foot plate have a counterpoint, when the first frame part is displaced in relation to the second frame part, hence the lever principle is used for lifting the heavy load.

If the vehicle does not have a towing hook the aforementioned embodiment of the present invention cannot be used. As an alternative to the aforementioned embodiment the first foot plate and/or the second foot plate comprise a holding device, which can be a number of grip units mounted on to the first foot plate and/or the second foot plate, and be adapted to engage with e.g. the bumper of the vehicle or a perforated plate, which is connected to either the bumper of the vehicle or the undercarriage of the vehicle. When the grip units engage with the bumper of the vehicle or the perforated plate, it is possible to perform the vertical displacement of the first frame part.

To ensure that the sack truck is maintained in a fixed position, at least when the heavy load is lifted and moved onto the vehicle, a breaking arrangement is provided at the wheels.

The breaking arrangement comprises at least one brake shoe, which in an activated position engages with the wheel and thereby locks the wheel in a dead lock position.

According to one embodiment of the present invention the breaking arrangement comprises one braking shoe, which engages with either the right or the left wheel of the sack truck. According to an alternative embodiment of the present invention the breaking arrangement comprises two braking shoes, hence a braking shoe engages with both the right and the left wheel of the sack truck.

According to a preferred embodiment of the present invention the breaking arrangement, furthermore, comprises activation/deactivation means for the at least one braking shoe. The activation/deactivation means comprises a lever connected to a rotable shaft, which is mounted on the second frame part. The braking shoes are connected to the rotable shaft. Between the lever and a mounting connected to the wheel shaft a spring is arranged. A wire is at one end connected to the lever, and at the other end it is connected to an operating handle, which is mounted to one of the handles on the first frame part.

Activation of the operating handle causes the lever to move upwards and the rotable shaft to rotate anticlockwise to move the braking shoes away from the engagement with the wheels.

The aforementioned type of activation/deactivation means is of the type maintaining a breaking force on the wheels, whenever the operating handle is not activated. Hence the sack truck can be moved, when the operating handle is activated only. An alternative to such activation/deactivation means are activation/deactivation means which only breaks the wheels, when the operating handle is activated. In that case it is necessary to lock the operating handle in a closed position, meanwhile the heavy load is lifted and moved into the vehicle.

Alternative types of braking arrangements are
breaks with braking shoes engaging the wheel rims e.g. horseshoe brakes,
drum brakes or the like The sack truck comprises a transport mounting allowing the sack truck to be mounted on the ball of the vehicle towing hook, hence it is possible to fully load the truck floor or the luggage compartment and still carry the sack truck around e.g. for the unloading of the vehicle.

According to a preferred embodiment of the present invention the lifting process occurs according to the following step:
the heavy load is placed on the first foot plate and/or the second foot plate and the sack truck is then tilted backwards,
the operating handle for the breaking arrangement is activated, and it is now possible to move the sack truck,
the sack truck is positioned behind the vehicle, and the coupling unit is placed on top of the ball of the vehicle's towing hook,
the operating handle for the breaking arrangement is deactivated, hence the sack truck is prevented from moving,
the sack truck is brought to upright position, during which the displacement arrangement allows a vertical upward displacement of the first frame part in relation to the second frame part, hence the heavy load is lifted to a level near or opposite the truck floor or the luggage compartment, and
the heavy load is now easily moved into the truck or the luggage compartment,
the sack truck is now moved away from the back end of the vehicle, and the operating handle of the displacement arrangement is activated, hence releasing the engagement of the displacement arrangement, thereby causing a vertical downward displacement of the first frame part in relation to the second frame part, and the sack truck is now ready to carry another heavy load.

The sack truck can also be used for unloading heavy loads from a vehicle and the vertical displacement of the first frame part in relation to the second frame part is preformed without any load being placed on the first foot plate or the second foot plate, hence the first foot plate or the second foot plate is preferably level with the luggage room or the truck bed for loading the heavy loads. Afterwards the sack truck is tilted backwards.

According to another preferred embodiment of the present invention the unloading process occurs according to the following step:
the sack truck is positioned behind the vehicle, and the coupling unit is placed on top of the ball of the vehicle's towing hook,
the operating handle of the breaking arrangement is deactivated, hence the sack truck is prevented from moving,
the sack truck is brought to upright position thus the displacement arrangement allows a vertical upward displacement of the first frame part in relation to the second frame part, hence the first foot plate and/or the second foot plate are moved to a level near or opposite the truck floor or the luggage compartment, and
the heavy load is now easily loaded onto the first foot plate and/or the second foot plate,
the sack truck is tilted slightly backwards (preferably to 45° or less), whereby the engagement of the coupling unit and the ball of the vehicle's towing hook is released,
the operating handle of the displacement arrangement is activated, hence the engagement of the displacement arrangement is released, thus causing a vertical downward displacement of the first frame part in relation to the second frame part, and the heavy load is lowered down, and
the sack truck is ready to transport the heavy load.

SHORT DESCRIPTION OF THE FIGURES

Figure 3:
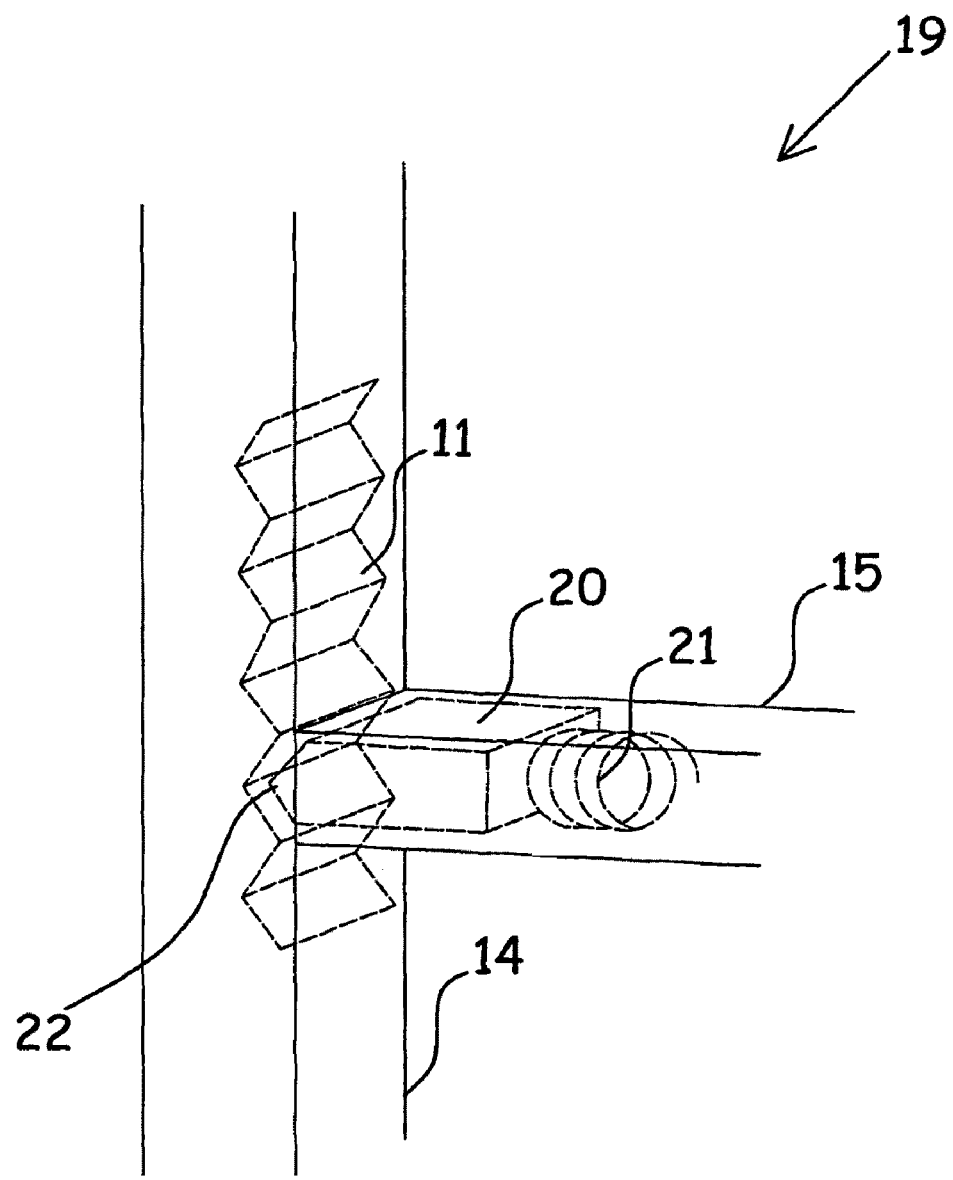
Figure 4:
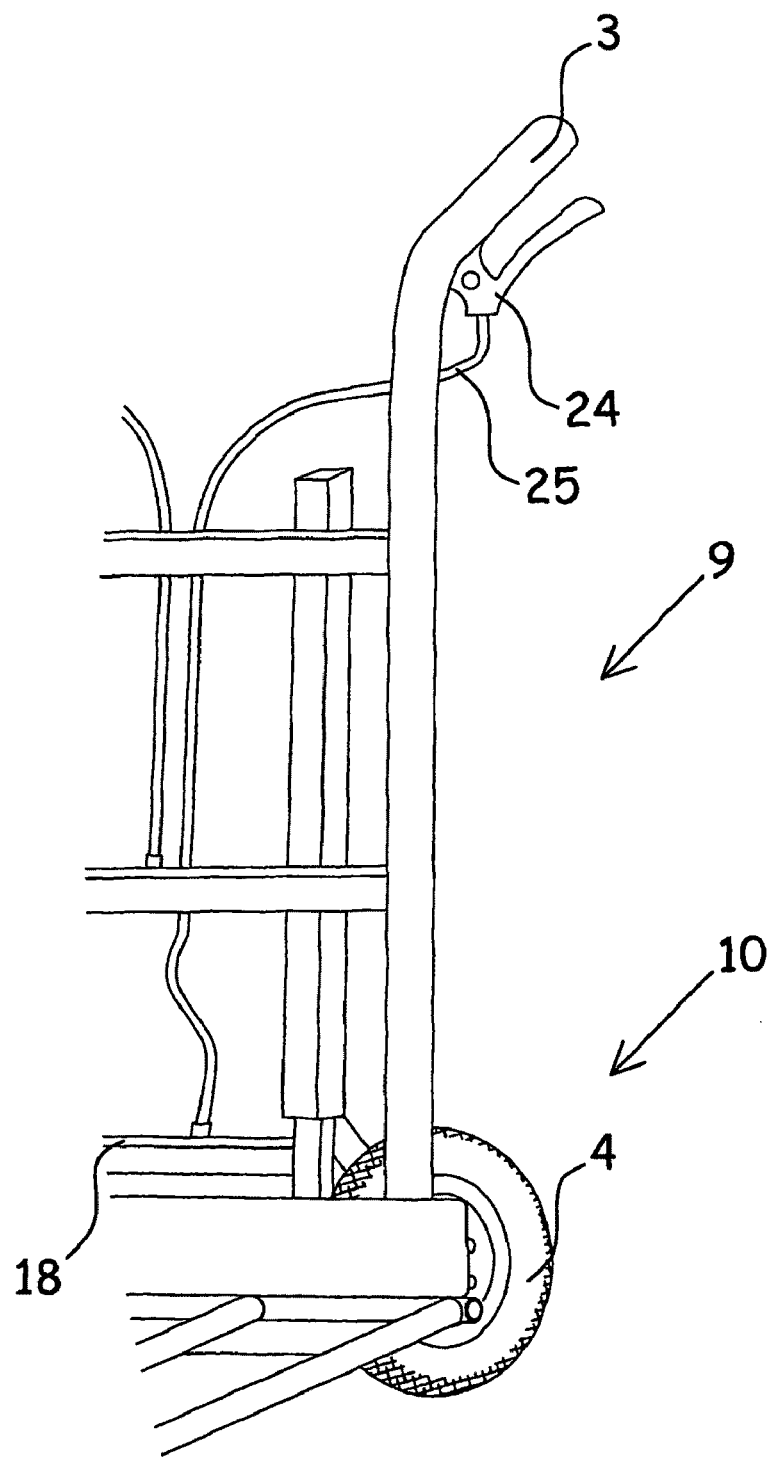
Figure 5A:
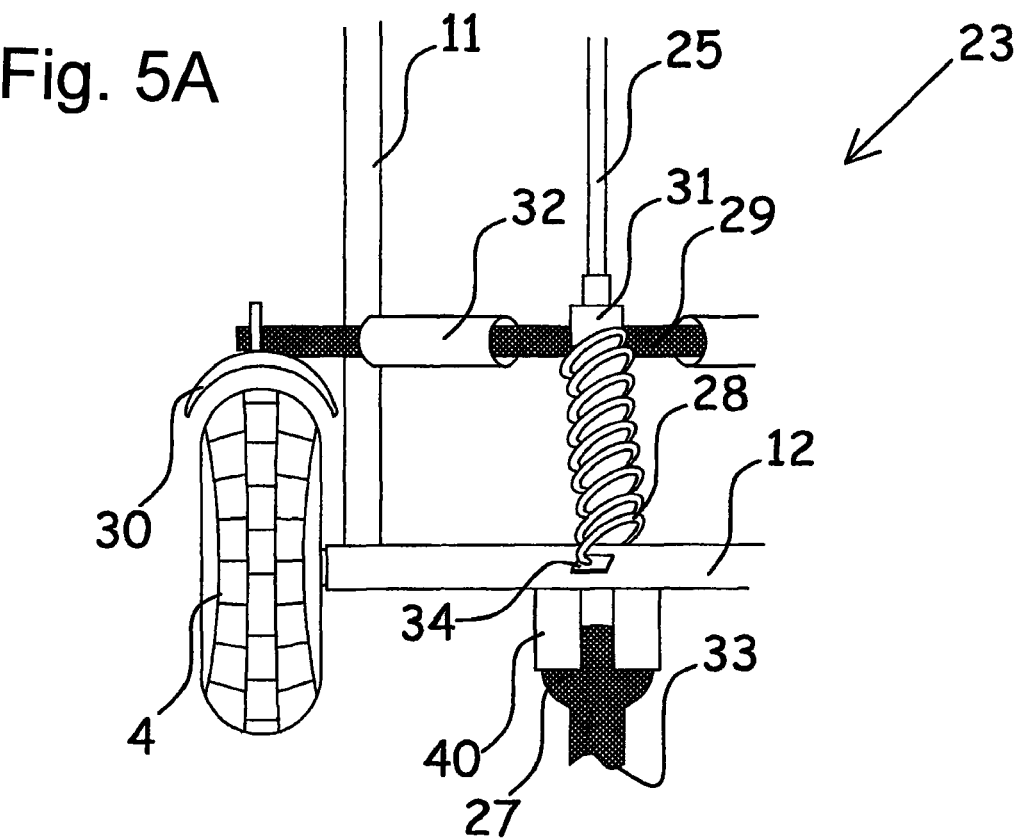
Figure 5B:
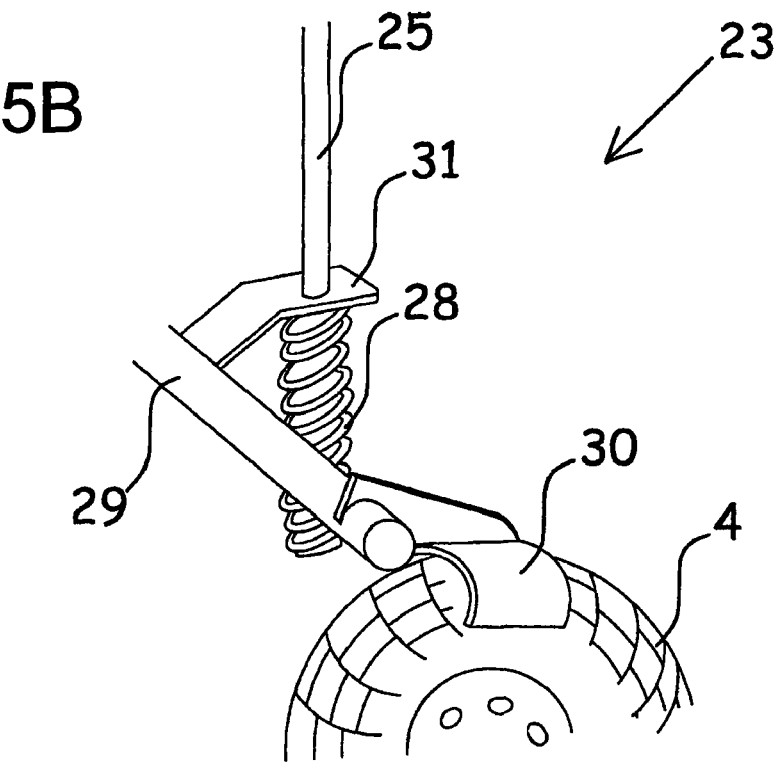

The invention is explained in more details in the following with reference to the figures, where:
FIG. 1 shows a sack truck according to the invention,
FIG. 2 shows the first and the second frame part,
FIG. 3 shows the toothed rack bar and pawl arrangement,
FIG. 4, 5A and 5B shows the braking arrangement, and
FIG. 6A, 6B, 7A and 7B shows the lifting process.

DETAILED DESCRIPTION OF THE INVENTION

FIG. 1 shows a sack truck 1 comprising a main frame 2 with handles 3 at an upper end of the main frame 2 and two wheels 4 and a first foot plate 5 and a second foot plate 6 at a lower end of the main frame 2, and where the second foot plate 6 is rotably connected to the first foot plate 5. At handle 3 is provided an operation handle 7 for the displacement arrangement, and a wire 8 connects operation handle 7 with the spring compression unit (not shown). The plate 16 is connected to the second foot plate 6 and on the lower side 40 (FIG. 5) of the plate 16 the coupling unit 26 (FIG. 6) is arranged.

Figure 2:
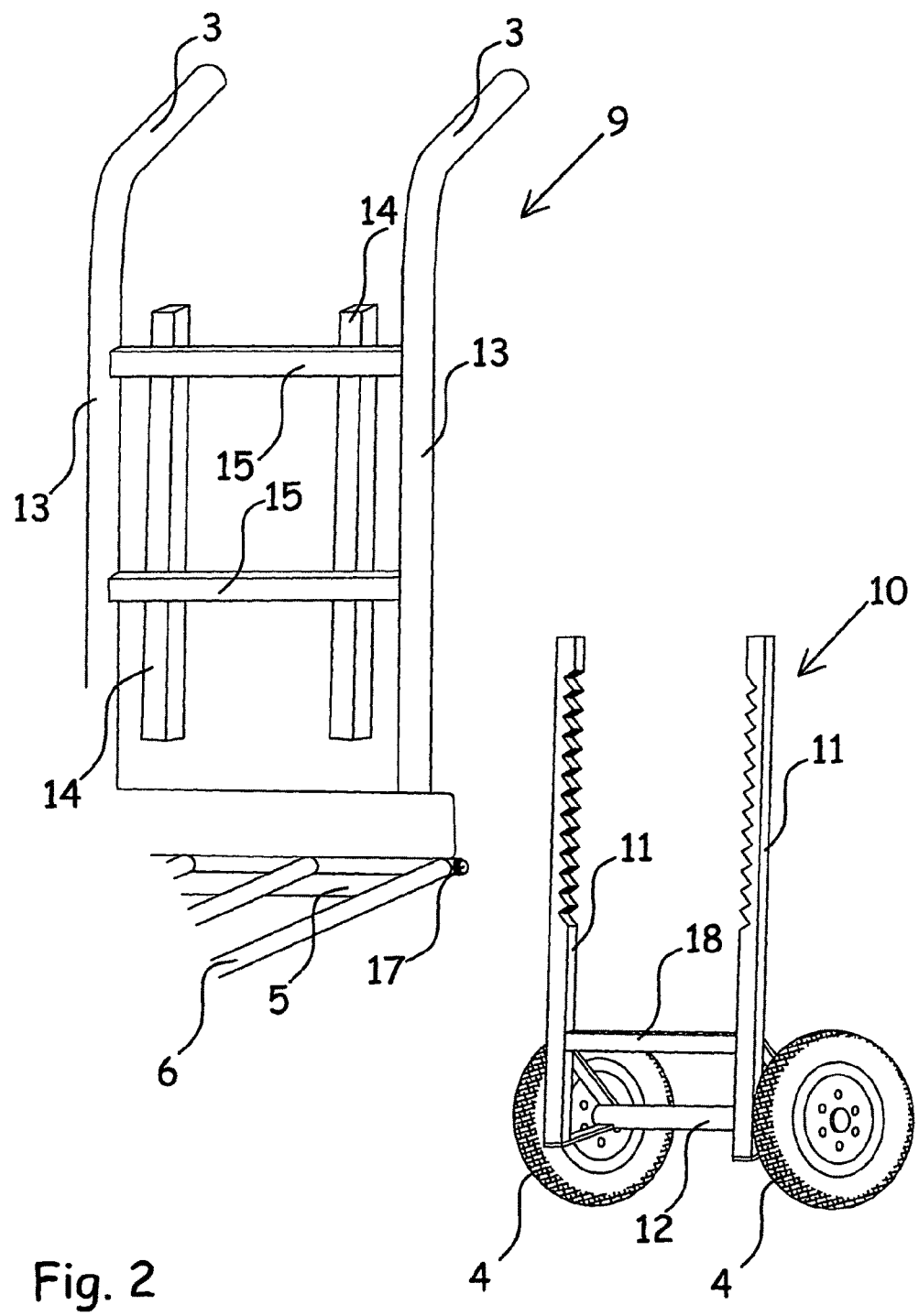

FIG. 2 shows the first frame part 9 and the second frame part 10. The first frame part 9 comprises handles 3, which are an integral part of the upper end of the side profiles 13, which are separated by stiffener profiles 15. Connected to the stiffener profiles 15 are guide tubes 14, which are arranged to receive the toothed rack bars 11 of the second frame part 10. The second foot plate 6 is rotably connected to the first foot plate 5 by shaft 17, and the second foot plate 6 is shown folded down, whereby it rests on the first foot plate 5, hence preventing the second foot plate 6 from rotating further. The second frame part 10 comprises toothed rack bars 11, which are arranged to slide into the guide tubes 14 of the first frame part 9. The wheels 4 are arranged on the shaft 12, which is connected to the lower end of the toothed rack bars 11, which are separated by the stiffener profile 18.

FIG. 3 shows the toothed rack bar and pawl arrangement 19, where the toothed rack bar 11 is sliding inside the guide tube 14. The pawl 20 is formed with an end part 22 with a sloping side and the end part engages the teeth of the toothed rack bar 11. To ensure that the pawl 20 engages with the teeth of the toothed rack bar 11 a spring 21 is positioned behind the pawl 20 forcing the end part 22 into the teeth of the toothed rack bar 11, thereby preventing any unwanted movement of the toothed rack bar 11 in relation to the guide tube 14.

FIG. 4, 5A and 5B shows the braking arrangement 23, which comprises activation/deactivation means for the braking shoe 30. The activation/deactivation means comprises a lever 31 connected to a rotable shaft 29, which is mounted 32 to toothed rack bar 11. The braking shoe 30 is connected to the rotable shaft 29. Between the lever 31 and a mounting 34 connected to the wheel shaft 12 a spring 28 is arranged. A wire 25 is at one end connected to the lever 31, and at the other end it is connected to an operating handle 24, which is mounted to handle 3. Due to the vertical displacement of the first frame part 9 in relation to the second frame part 10 it is important that the wire has a substantial length allowing a maximum vertical displacement of the first frame part 9 in relation to the second frame part 10, and the activation/deactivation of the braking arrangement 23. Activation of the operating handle 24 causes the lever 31 to move upwards and the rotatable shaft 29 to rotate anticlockwise to move the braking shoe 30 away from the engagement with the wheels 4. Furthermore, FIG. 5A shows how the sack truck can be mounted on the ball 27 of the vehicle towing hook 33 e.g. in case there is no room for the sack truck in the vehicle.

Figure 6B:
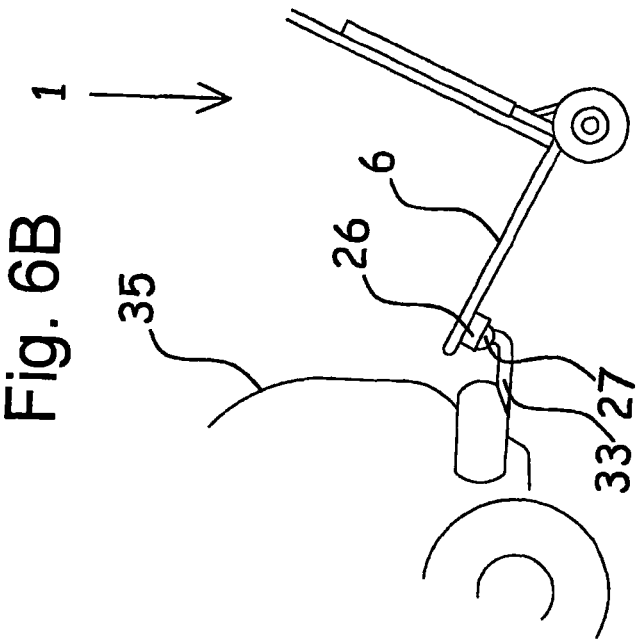
Figure 6A:
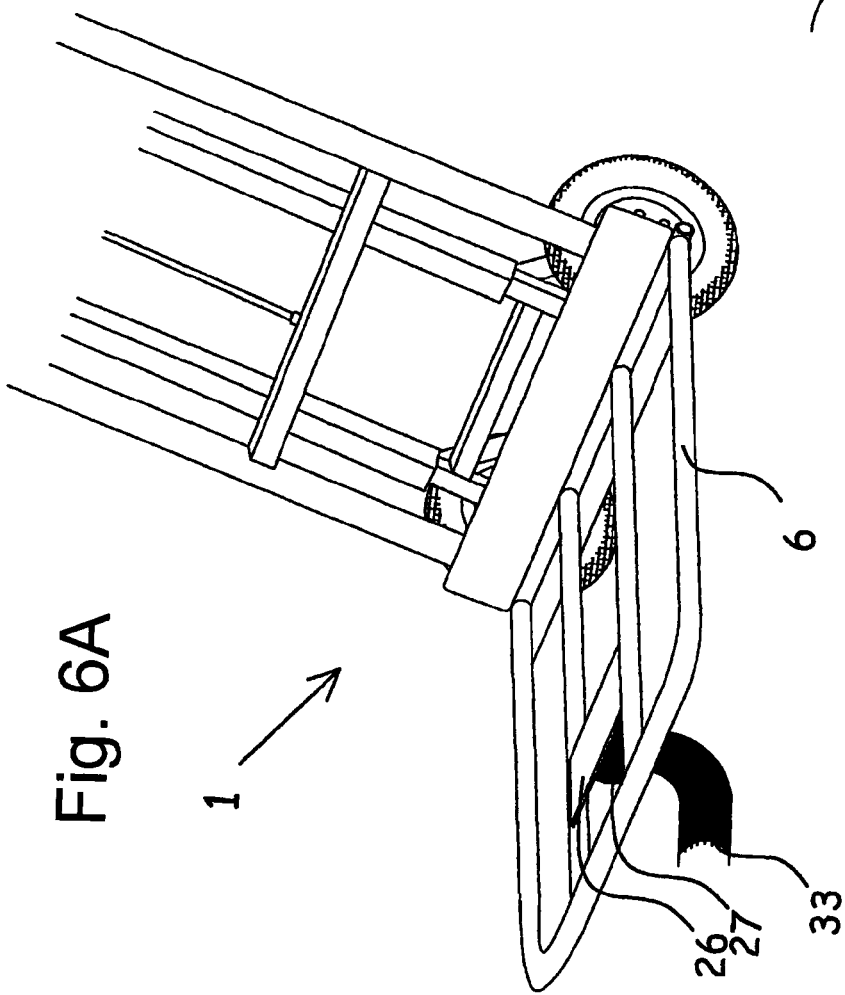
Figure 7B:
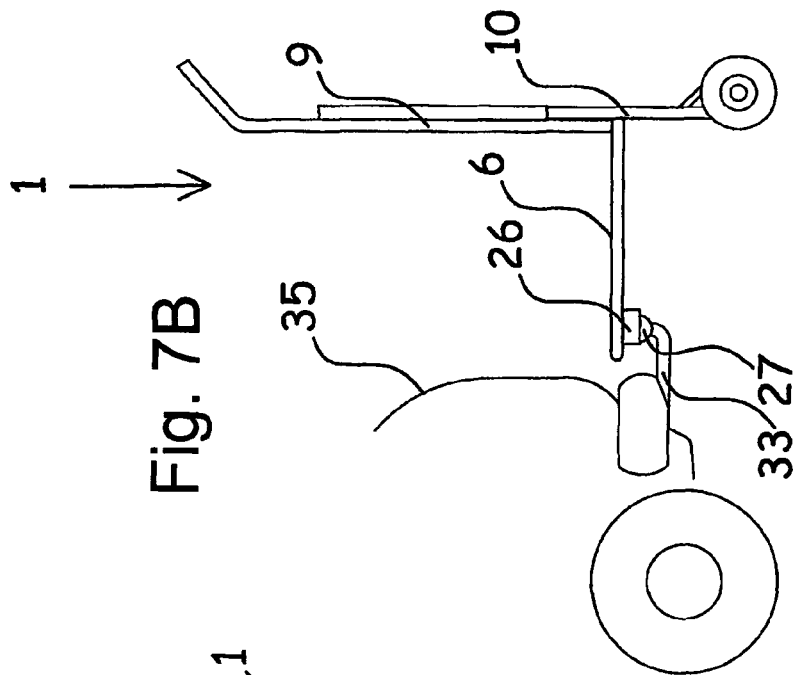
Figure 7A:
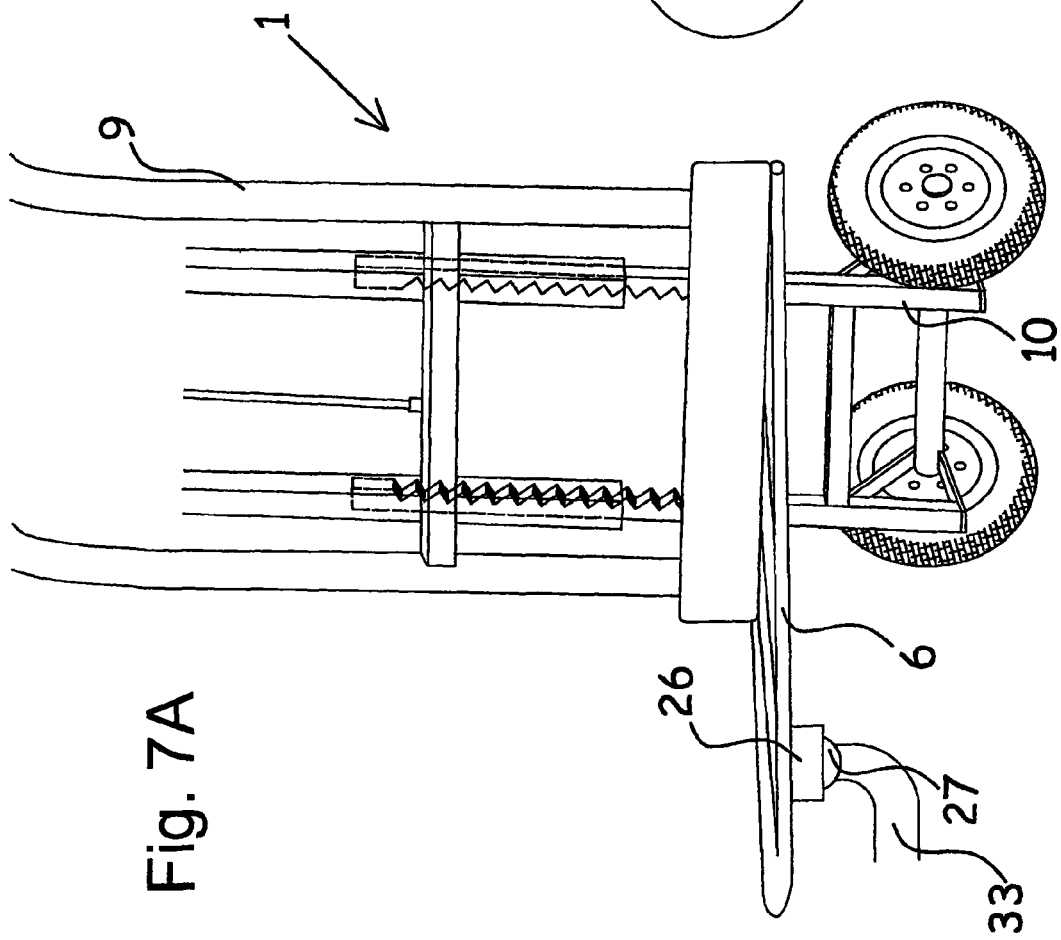

FIG. 6A, 6B, 7A and 7B shows the lifting process, where FIG. 6A shows that a heavy load (not shown) is placed on the folded down second foot plate 6, and the sack truck 1 is tilted backwards and moved into a position behind the vehicle 35, and the coupling unit 26 is placed on top of the ball 27 of the vehicle's 35 towing hook 33, and where FIG. 7A shows that the sack truck 1 is brought to an upright position, during which the displacement arrangement allows a vertical upward displacement of the first frame part 9 in relation to the second frame part 10, hence lifting the heavy load (not shown) to a level near or opposite the truck floor or the luggage compartment of the vehicle 35.

The invention claimed is:

1. Sack truck (1) comprising a main frame (2), a number of handles (3), a number of wheels (4) and a first foot plate (5), wherein the main frame (2) comprises two separate frame parts, a first separate frame part (9) and a second separate frame part (10), which are arranged to engage at a displacement arrangement, wherein the first separate frame part comprises side profiles, handles connected to the side profiles, and stiffener profiles extending between and fixed to the side profiles, and guide tubes connected to the stiffener profiles, wherein the second separate frame part further comprises spaced vertical rack bars inserted in the guide tubes, wherein the displacement arrangement further comprises two sliding pawls and springs forcing the pawls onto contact with teeth of the rack bars, an operator handle connected to one of the handles and a wire connected to the springs for compressing springs, allowing a displacement of the first separate frame part (9) in relation to the second separate frame part (10), wherein a second foot plate (6) is pivotally connected to the first foot plate (5) or the first frame part (9), wherein the handles (3) and the first foot plate (5) are connected to the first frame part (9), wherein the handles are connected at an upper end of the first frame part (9) and the first foot plate (5) is connected at a lower end of the first frame part (9), wherein the wheels (4) are arranged in connection with the second frame part (10) and the wheels (4) are connected at a lower end of the second frame part (10).

2. Sack truck (1) according to claim 1, wherein the displacement arrangement, furthermore, comprises a deactivating unit (7, 8).

3. Sack truck (1) according to claim 1, wherein the displacement arrangement, furthermore, comprises shock absorber means.

4. Sack truck (1) according to claim 1, wherein the second foot plate (6) comprises a locking arrangement arranged for pivotal connection to the first foot plate (5) or the first frame part (9).

5. Sack truck (1) according to claim 1, wherein the first foot plate (5) and/or the second foot plate (6) comprises a coupling unit (26).

6. Sack truck (1) according to claim 1, wherein the first foot plate (5) and/or the second foot plate (6) comprise a holding device.

7. Sack truck (1) according to claim 1, wherein the second frame part further comprising a braking arrangement (23).

8. Sack truck (1) according to claim 1, wherein the first frame part further comprising a transport mounting (40).

9. Sack truck according to claim 1, wherein the spaced vertical rack bars of the second separate frame part have inward facing rack teeth.

10. Sack truck apparatus according to claim 1, wherein the wheels are located inward from the side profiles of the first separate frame part.

* * * * *